Nov. 22, 1949  A. J. PENICK  2,488,932
VALVE ASSEMBLY
Filed Jan. 10, 1946  3 Sheets-Sheet 1

Inventor
Arthur J. Penick
By
E. V. Hardway
Attorney

Nov. 22, 1949     A. J. PENICK     2,488,932
VALVE ASSEMBLY

Filed Jan. 10, 1946     3 Sheets-Sheet 2

Inventor
Arthur J. Penick
By E. V. Hardway,
Attorney

Nov. 22, 1949   A. J. PENICK   2,488,932
VALVE ASSEMBLY
Filed Jan. 10, 1946   3 Sheets-Sheet 3

Inventor
Arthur J. Penick
By
E. V. Hardway
Attorney

Patented Nov. 22, 1949

2,488,932

UNITED STATES PATENT OFFICE 2,488,932

VALVE ASSEMBLY

Arthur J. Penick, Houston, Tex., assignor to Oil Center Tool Company, Houston, Tex., a corporation of Texas.

Application January 10, 1946, Serial No. 640,236

6 Claims. (Cl. 251—93)

This invention relates to a valve assembly and has particular relation to an assembly of the character described including a plug valve.

An object of the invention is to provide a valve assembly embodying a casing having a flowway therethrough with an expander mounted in the casing and having a passageway therethrough aligned with said flowway with an expansible plug valve in the casing around the expander and having oppositely disposed openings and turnable to align the openings with said flowway and passageway to open the valve and out of such alignment to close the valve.

Another object of the invention is to provide, in a valve assembly of the character described, an expander movable to one position to expand the valve to prevent leakage about the valve either when in open or closed position and movable to another position to permit the easy turning of the valve to either of said positions.

Another object of the invention is to provide novel means for locking the expander in valve expanding position.

The invention also includes novel means for lubricating the valve and valve expander.

With the above and other objects in view the invention has particular relation to certain novel features of construction, arrangement of parts and use, an example of which is given in this specification and illustrated in the accompanying drawings, wherein.

Figure 1:
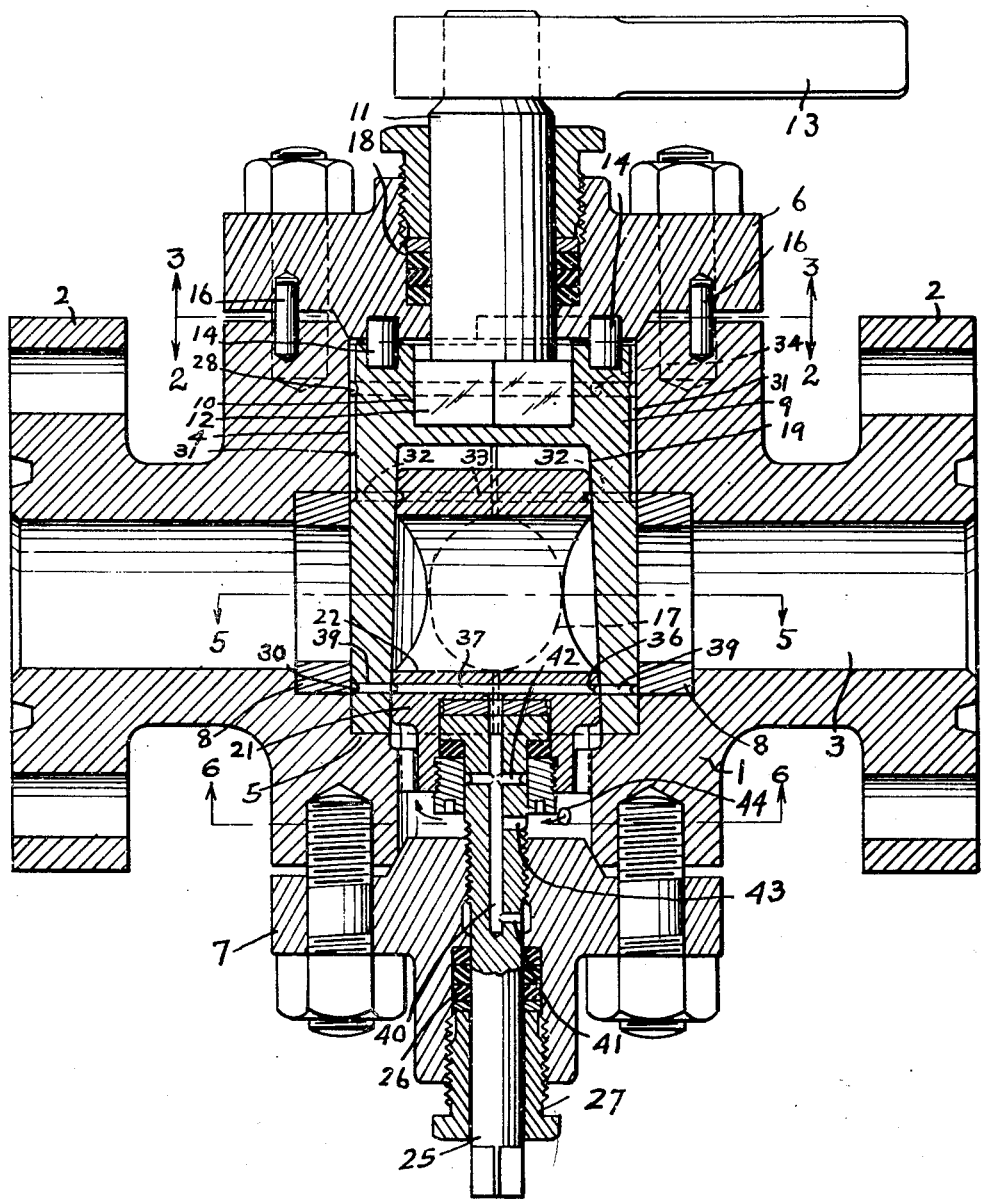
Figure 1 is a longitudinal sectional view of the assembly.
Figure 2:
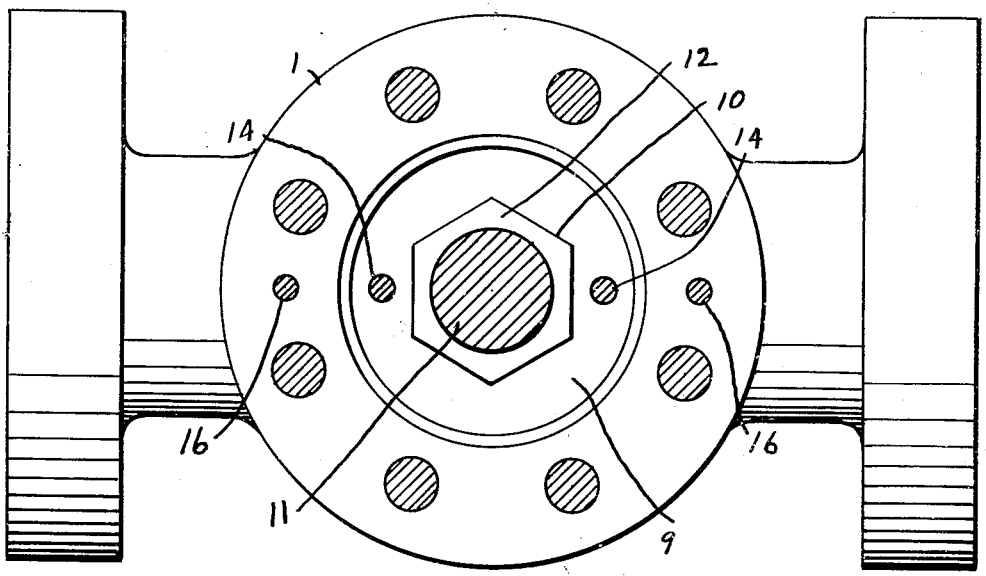
Figure 2 is a sectional view taken on the line 2—2 of Figure 1.

Referring now more particularly to the drawings wherein like numerals of reference designate the same parts in each of the figures, the numeral 1 designates the valve casing having the external end flanges 2, 2 which form one means for connecting the casing into a flow line. The valve casing also has a flowway 3 therethrough and has a counterbore 4 at approximately right angles to the flowway one end of which is reduced forming an internal annular shoulder 5.

Bolted, or otherwise secured, to the casing, and closing the respective ends of the bore are the caps 6 and 7. Countersunk into the valve casing and surrounding the flowway 3 and whose inner faces are flush with the wall of the bore 6 are the annular valve seats 8, 8. These seats are desirable although they are not indispensable.

Fitted within the bore 4, with its inner end abutting the shoulder 5 there is a valve 9 which is of a substantially cylindrical contour.

The end of this valve adjacent the cap 6 is formed with a polygonal recess 10 and a valve stem 11 is provided whose inner end is provided with a head 12 which fits into said recess whereby the valve may be turned.

As illustrated there is a handle 13 on the outer end of the stem which provides convenient means for turning the valve.

The end of the valve adjacent the cap 6 has the studs 14, 14 inset therein and which project into arcuate grooves 15, 15 in the cap. These grooves are of a length to limit the turning movement of the valve to a quarter turn. The cap 6 and the adjacent end of the valve casing also have the studs 16, 16 whose ends extend into bores in the cap and casing, as shown in Figure 1, so as to properly position the cap relative to the valve. The valve has the side openings 17, 17 therethrough and the grooves 15 of the cap are thus positioned so that the openings 17 will align with the flowway when the valve is turned to open position and will be out of alignment with said flowway when the valve is closed. The valve is shown in closed position in Figures 1 and 5.

Surrounding the stem 11 and mounted in the cap 6 there is suitable sealing means to seal around the stem to prevent leakage. In the present illustration the sealing means is shown as a conventional stuffing box 18.

Figures 3, 4:
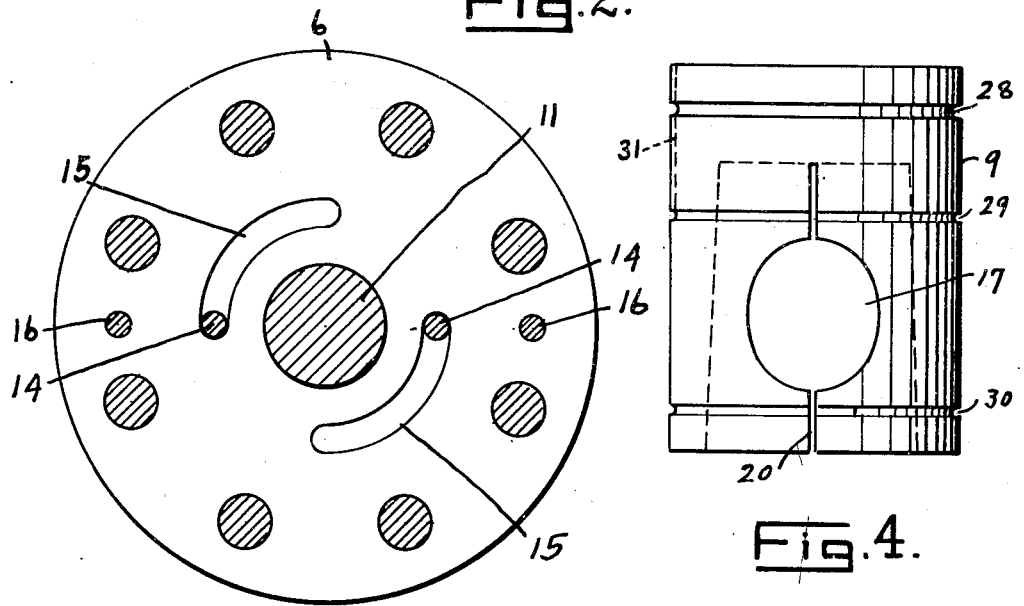
Figure 3 is a sectional view taken on the line 3—3 of Figure 1.
Figure 4 is a side view of the valve.
Figure 5:
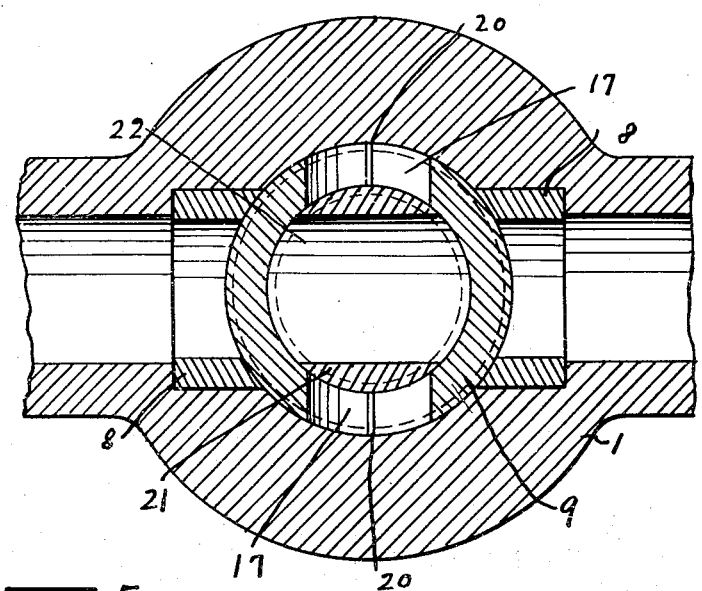
Figure 5 is a sectional view taken on the line 5—5 of Figure 1.

The end of the valve opposite the recess 10 is counterbored forming an expander seat 19 which flares from its inner end to the outer end of the valve and from the inner end of the seat 19 to the outer end of the valve, the valve has the oppositely disposed longitudinal slits 20, 20 which are on the same sides of the valve as the openings 17, as shown in Figures 4 and 5.

Figure 6:
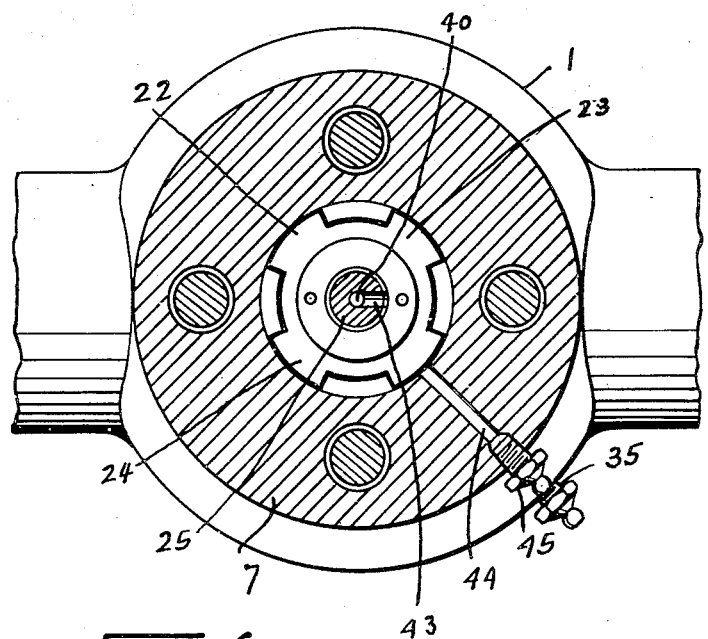
Figure 6 is a cross-sectional view taken on the line 6—6 of Figure 1.

Within the valve there is an expander 21 which has a passageway 22 extending transversely therethrough which is aligned with, and is of slightly greater diameter than, the flowway 3. This expander is externally tapered to conform to the taper of the expander seat 19. One end of the expander is reduced in diameter and the reduced end is provided with longitudinal splines 23 which fit between similar splines 24 in the inner wall of the valve casing, as shown in Figures 1 and 6, whereby the expander is held against turning, but has a longitudinal movement relative to the valve.

There is an expander stem 25 whose inner end has a swivelling connection with the expander. This stem extends out axially through the cap 7 and has a threaded connection therewith and there is a seal in the cap 7 around the outer end of said stem. In the present illustration this seal is shown as a conventional stuffing box 26. The outer end of the stem 25 is formed polygonal to receive a wrench by means of which it may be turned. The stuffing box 26 is formed of packing seated in the cap 7 around the stem 25 and a gland 27 which surrounds the stem 25 and is screwed into the cap 7 and whose inner end abuts said packing. When the gland 27 is screwed against the packing it will compress the packing and cause it to frictionally hold the stem 25 against turning as well as prevent leakage past said stem 25. Upon release of the gland 27 from the packing the stem 25 may be turned and being threaded with the cap 7 upon turning the stem 25 in one direction the expander will be caused to wedge tightly in the valve and expand it and when turned in the other direction will release the expander from the valve permitting the valve to contract.

When the valve is contracted it may be readily turned by the handle 13 to align the openings 17 with the flowway, thus opening the valve; or it may be turned to another position to carry the openings 17 out of alignment with the flowway to close the valve.

When the valve is in either open or closed position the stem 25 may then be turned to force the expander inwardly with relation to the expander seat 19 so as to expand the valve to prevent leakage about it. When the valve is moved to either of said positions it will be stopped by the studs 14 reaching the corresponding ends of the grooves 15 so as to insure the stoppage of the valve in fully opened or in completely closed position.

It will be noted from an inspection of Figure 4 that the valve has the external lubricating grooves 28, 29 and 30 therearound and has the longitudinal side grooves 31, 31 leading from the groove 29 past the groove 28 and on to the corresponding end of the valve and leading inwardly from the groove 29 through the wall of the valve are the channels 32, 32 and the corresponding end of the expander has a groove 33 therearound aligned with the channels 32. A lubricant may be introduced into the groove 28 through an inlet channel 34 through the wall of the casing and whose outer end is provided with a fitting 35 for connection of a grease gun thereto. The lubricant will pass through the grooves 28 and 31 and the channels 32 to the groove 33 to lubricate the corresponding end of the valve and expander.

The opposite end of the expander has an external annular groove 36 therearound and a channel 37 therethrough whose ends are connected with the groove 36 and the corresponding end of the valve has the external annular groove 30 therearound with passageways 39 leading therefrom through the wall of the valve and registering with the groove 36.

The inner end of the stem 25 has an axial channel 40 whose inner end enters the channel 37 and the channel 40 has the lateral ports 41 and 42 through which a lubricant may pass to lubricate the stem 25. The channel 40 also has an inlet port 43.

A lubricant may be introduced through the inlet channel 44 through a fitting 45 in the outer end thereof and this lubricant will reach the splines 23, 24 and the corresponding end of the valve and expander and will also pass through the port 43 and through the channel 40 and the ports 41 and 42 and also through the channel 37 and the passageways 39 and groove 30 so as to thoroughly lubricate said movable parts.

The drawings and description are illustrative merely while the broad principle of the invention will be defined by the appended claims.

What I claim is:

1. A valve assembly comprising, a tubular valve casing, means on the casing for connecting the casing into a flow line, said casing having a flowway therethrough aligned with said connecting means and also having a bore at approximately right angles to the flowway, one end of the bore being reduced forming an internal annular shoulder, end caps secured on to opposing ends of the casing and closing the respective ends of the bore, a cylindrical valve fitted within the bore with its inner end abutting said shoulder and whose other end is formed with stem engaging means, a valve stem fitted through the corresponding cap, means on the inner end of the stem provided to engage with said stem engaging means to turn the valve when the stem is turned, means carried by the stem and the corresponding cap for limiting the range of turning movement of the valve, said valve having side openings movable into and out of registration with said flowway, the end of the valve opposite said recess being formed with a deep inwardly tapering counterbore forming an expander seat and being longitudinal slitted to render the valve expansible, an expander having a passageway therethrough which is aligned with the flowway and is of slightly larger diameter than the flowway, said expander being externally tapered to conform to the taper of the expander seat, means for maintaining the expander against turning and means for moving the expander longitudinally relative to the valve to expand the valve when moved in one direction and to allow the valve to contract when moved in the other direction.

2. A valve assembly comprising, a valve casing having a flowway therethrough, an expansible valve extending transversely across the flowway and rotatably mounted in the casing, said valve having an axial tapered bore extending throughout its major portion and also having side openings which are movable into and out of registration with the flowway as said valve is rotated, a one-piece expander having the major portion thereof disposed within the bore of the valve and having its outer surface tapered to co-act with the tapered wall of said bore, said expander having side openings aligned with the flowway of the valve casing, and means accessible to an operator exteriorly of the valve casing for moving the expander longitudinally with respect to the valve to expand and permit contraction of said valve.

3. A valve assembly comprising, a valve casing having a flowway therethrough, an expansible valve extending transversely across the flowway and rotatably mounted in the casing, said valve having an axial tapered bore extending throughout its major portion and also having side openings which are movable into and out of registration with the flowway as said valve is rotated, a one-piece expander having the major portion thereof disposed within the bore of the valve and having its outer surface tapered to coact with the tapered wall of said bore, said expander having side openings aligned with the flowway of the valve casing, co-acting means on the expander and on the valve casing for preventing rotation of the expander while permitting longitudinal movement thereof with respect to the casing and the valve within said casing, and means accessible to an operator exteriorly of the valve casing for moving the expander longitudinally with respect to the valve to expand and permit contraction of said valve.

4. A valve assembly as set forth in claim 2, wherein the means accessible to an operator for moving the expander is an operating stem attached by a swivel connection to the lower end of the expander and extending outwardly through the valve casing and also wherein the operating stem is threaded within the casing whereby rotation of the stem imparts rotation thereto and to the expander to which it is connected.

5. A valve assembly as set forth in claim 2, wherein the means accessible to an operator for moving the expander is an operating stem attached by a swivel connection to the lower end of the expander and extending outwardly through the valve casing and also wherein the operating stem is threaded within the casing whereby rotation of the stem imparts rotation thereto and to the expander to which it is connected, an operating member connected with the valve and also accessible from the exterior for rotating the valve, and means for introducing lubricant to the end of the valve and expander to lubricate the adjacent faces of the movable parts.

6. A valve assembly as set forth in claim 2, wherein the means accessible to an operator for moving the expander is an operating stem attached by a swivel connection to the lower end of the expander and extending outwardly through the valve casing and also wherein the operating stem is threaded within the casing whereby rotation of the stem imparts rotation thereto and to the expander to which it is connected, and a packing gland mounted in the casing and surrounding the operating stem for packing off therearound, tightening of said gland functioning to lock the stem against rotation with respect to the casing.

ARTHUR J. PENICK.

REFERENCES CITED

The following references are of record in the file of this patent:

UNITED STATES PATENTS

| Number | Name | Date |
|---|---|---|
| 321,694 | Darling | July 7, 1885 |
| 1,949,191 | Smolensky | Feb. 27, 1934 |
| 2,176,730 | Church | Oct. 17, 1939 |

FOREIGN PATENTS

| Number | Country | Date |
|---|---|---|
| 503,022 | France | Mar. 6, 1920 |